United States Patent
Lambricht et al.

(10) Patent No.: US 9,630,874 B2
(45) Date of Patent: Apr. 25, 2017

(54) GLASS SHEET WITH A HIGH LEVEL OF INFRARED RADIATION TRANSMISSION

(71) Applicant: AGC GLASS EUROPE, Louvain-la-Neuve (BE)

(72) Inventors: Thomas Lambricht, Perwez (BE); Audrey Dogimont, Sart-Dames-Avelines (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/768,614

(22) PCT Filed: Feb. 10, 2014

(86) PCT No.: PCT/EP2014/052517
§ 371 (c)(1),
(2) Date: Aug. 18, 2015

(87) PCT Pub. No.: WO2014/128016
PCT Pub. Date: Aug. 28, 2014

(65) Prior Publication Data
US 2016/0002094 A1     Jan. 7, 2016

(30) Foreign Application Priority Data
Feb. 19, 2013   (BE) .................... 2013/0110

(51) Int. Cl.
B32B 17/00     (2006.01)
B32B 15/00     (2006.01)
C03C 3/087     (2006.01)
C03C 4/10      (2006.01)
C03C 3/085     (2006.01)

(52) U.S. Cl.
CPC ............ C03C 3/087 (2013.01); C03C 3/085 (2013.01); C03C 4/10 (2013.01); *C03C 2204/00* (2013.01)

(58) Field of Classification Search
USPC ....... 428/426, 428, 432, 688, 689, 697, 699, 428/701, 702
See application file for complete search history.

(56) References Cited

U.S. PATENT DOCUMENTS

| | | | |
|---|---|---|---|
| 4,542,375 A | 9/1985 | Alles et al. | |
| 6,461,736 B1 * | 10/2002 | Nagashima | C03C 3/087 428/426 |
| 7,763,678 B2 * | 7/2010 | Yamaya | C09D 183/14 428/447 |
| 9,028,967 B2 * | 5/2015 | Koike | C03C 3/085 428/410 |
| 2004/0110625 A1 * | 6/2004 | Smith | C03B 5/2353 501/72 |
| 2006/0211563 A1 * | 9/2006 | Arbab | C03C 3/087 501/70 |
| 2007/0161492 A1 * | 7/2007 | Smith | C03C 1/002 501/64 |
| 2013/0142994 A1 * | 6/2013 | Wang | C03C 15/00 428/141 |
| 2014/0017500 A1 | 1/2014 | Koike et al. | |
| 2014/0092052 A1 * | 4/2014 | Grunthaner | G06F 3/044 345/174 |
| 2014/0152914 A1 * | 6/2014 | King | C03C 3/00 349/12 |
| 2014/0326314 A1 | 11/2014 | Dogimont et al. | |
| 2015/0072156 A1 | 3/2015 | Dogimont et al. | |

FOREIGN PATENT DOCUMENTS

WO    2012 128180    9/2012

OTHER PUBLICATIONS

Volf ("Chemical Approach to Glass").*
Office Action issued Apr. 8, 2015 in Taiwanese Application 103105516, filed on Feb. 19, 2014 (English translation only).
U.S. Appl. No. 14/771,390, filed Aug. 28, 2015, Lambricht, et al.
U.S. Appl. No. 14/773,551, filed Sep. 8, 2015, Lambricht, et al.
U.S. Appl. No. 14//773,489, filed Sep. 8, 2015, Lambricht, et al.
U.S. Appl. No. 14/768,614, filed Aug. 18, 2015, Lambricht, et al.
U.S. Appl. No. 14/889,510, filed Nov. 6, 2015, Dogimont, et al.
International Search Report Issued Mar. 28, 2014 in PCT/EP2014/052517 filed Feb. 10, 2014.

* cited by examiner

*Primary Examiner* — Lauren R Colgan
(74) *Attorney, Agent, or Firm* — Oblon, McClelland, Maier & Neustadt, L.L.P.

(57) ABSTRACT

The invention relates to a glass sheet with a high level of infrared radiation transmission, that can be used especially in a tactile tablet, panel or screen. More precisely, the invention relates to a glass sheet having a composition comprising, as a content expressed in total weight percentages of glass: $SiO_2$ 55-78%; $Al_2O_3$ 0-18%; $B_2O_3$ 0-18%; $Na_2O$ 5-20%; CaO 0-15%; MgO 0-10%; $K_2O$ 0-10%; BaO 0-5%; total iron (expressed in the form of $Fe_2O_3$) 0.002-0.06%; and a chromium content (expressed in the form of $Cr_2O_3$) of between 0.002 and 0.06%.

20 Claims, No Drawings

GLASS SHEET WITH A HIGH LEVEL OF INFRARED RADIATION TRANSMISSION

FIELD OF THE INVENTION

The present invention relates to a glass sheet exhibiting high transmission of infrared radiation. The general field of the invention is that of optical touch panels fitted above areas of display surfaces.

It is by virtue of its high transmission of infrared (IR) radiation that the glass sheet according to the invention can advantageously be used in a touchscreen or touch panel or touchpad using the optical technology referred to as Planar Scatter Detection (PSD) or also Frustrated Total Internal Reflection (FTIR) (or any other technology requiring high transmission of IR radiation) in order to detect the position of one or more objects (for example, a finger or a stylus) on a surface of the said sheet.

The invention consequently also relates to a touchscreen, touch panel or touchpad comprising such a glass sheet.

SOLUTIONS OF THE PRIOR ART

The PSD and FTIR technologies make it possible to obtain multiple-detection touchscreens/panels which are relatively inexpensive and which can have a relatively high tactile surface (for example, from 3 to 100 inches) while being thin.

These two technologies involve:
(i) the injection of infrared (IR) radiation, for example by virtue of LEDs, into a substrate transparent to infrared radiation starting from one or more edges;
(ii) the propagation of the infrared radiation inside the said substrate (which then acts as waveguide) via an optical phenomenon of total internal reflection (no radiation "exits" the substrate);
(iii) the contact of the surface of the substrate with any object (for example a finger or a stylus), resulting in a local perturbation by scattering of the radiation in all directions; some of the deflected rays will thus be able "to exit" the substrate.

In the FTIR technology, the deflected rays form an infrared light spot on the lower surface of the substrate, opposite the touch surface. These are seen by a special camera located above the device.

The PSD technology for its part involves two additional stages subsequent to stages (i)-(iii):
(iv) the analysis by a detector of the resulting IR radiation at the edge of the substrate; and
(v) the calculation by algorithms, starting from the radiation detected, of the position(s) of the object(s) in contact with the surface. This technology is set out in particular in the document US2013021300A1.

Basically, glass is a material of choice for touch panels as a result of its mechanical properties, its durability, its resistance to scratching and its optical clarity and because it can be chemically or thermally strengthened.

In the case of glass panels used for the PSD or FTIR technology and with a very large surface and thus with a relatively great length/width, the IR radiation injected has a long optical path length. In this case, the absorption of the IR radiation by the material of the glass thus significantly influences the sensitivity of the touch panel, which may then undesirably decrease in the length/width of the panel. In the case of glass panels used for the PSD or FTIR technology and with a smaller surface and thus with a shorter optical path length of the IR radiation injected, the absorption of the IR radiation by the material of the glass also has an influence, in particular on the energy consumption of the device incorporating the glass panel.

Thus, a glass sheet highly transparent to infrared radiation is very useful in this context, in order to guarantee an intact or sufficient sensitivity over the entire touch surface when this surface is large. In particular, a glass sheet with a coefficient of absorption at the wavelength of 1050 nm, generally used in these technologies, equal to or even less than 1 m$^{-1}$ is ideal.

In order to obtain high transmission in the infrared region (and in the visible region), it is known to reduce the total content of iron in the glass (expressed in terms of $Fe_2O_3$, according to the standard practice in the field), obtaining low-iron glasses. Glasses of silicates type always comprise iron as the latter is present as an impurity in the majority of the starting materials used (sand, limestone, dolomite, and the like). Iron exists in the structure of glass in the form of ferric $Fe^{3+}$ ions and ferrous $Fe^{2+}$ ions. The presence of ferric $Fe^{3+}$ ions confers, on the glass, a slight absorption of low-wavelength visible light and a stronger absorption in the near ultraviolet region (absorption band centred on 380 nm), while the presence of ferrous $Fe^{2+}$ ions (sometimes expressed as oxide FeO) results in a strong absorption in the near infrared region (absorption band centred on 1050 nm). Thus, the increase in the total iron content (in both these forms) accentuates the absorption in the visible region and in the infrared region. Furthermore, a high concentration of ferrous $Fe^{2+}$ ions results in a decrease in the transmission in the infrared region (in particular, the near infrared region). However, in order to achieve a coefficient of absorption at the wavelength of 1050 nm which is sufficiently low for the touch applications by influencing only the total iron content, this would require such a great decrease in this total iron content that either (i) this would result in production costs which are much too high, due to the need for very pure starting materials (which sometimes even do not exist sufficiently pure), or (ii) this would present production problems (in particular the premature wear of the furnace and/or difficulties of heating the glass in the furnace).

It is also known, in order to further increase the transmission of the glass, to oxidize the iron present in the glass, that is to say to reduce the content of ferrous ions in favour of the content of ferric ions. The degree of oxidation of a glass is given by its redox, defined as the ratio by weight of $Fe^{2+}$ atoms with respect to the total weight of the iron atoms present in the glass, $Fe^{2+}$/total Fe.

In order to reduce the redox of the glass, it is known to add an oxidizing component to the batch of starting materials. However, the majority of the known oxidants (sulfates, nitrates, and the like) have an oxidizing power which is not sufficiently strong to achieve the IR transmission values desired for the touch panels application using the FTIR or PSD technology.

OBJECTIVES OF THE INVENTION

The objective of the invention, in at least one of its embodiments, is to provide a glass sheet with a high transmission of infrared radiation. In particular, it is an objective of the invention to provide a glass sheet with a high transmission of near infrared radiation.

Another objective of the invention, in at least one of its embodiments, is to provide a glass sheet which, when it is used as touch surface in large-sized touchscreens, touch panels or touchpads, results in no or little loss in sensitivity of the touch function.

Another objective of the invention, in at least one of its embodiments, is to provide a glass sheet which, when it is used as touch surface in touchscreens, touch panels or touchpads of more modest sizes, is favourable to the energy consumption of the device.

Another objective of the invention, in at least one of its embodiments, is to provide a glass sheet with a high transmission of infrared radiation and with an aesthetic quality acceptable for the chosen application.

Finally, another objective of the invention is to provide a glass sheet with a high transmission of infrared radiation which is relatively inexpensive to produce.

ACCOUNT OF THE INVENTION

The invention relates to a glass sheet having a composition which comprises, in a content expressed as percentages by total weight of glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-15% |
| MgO | 0-10% |
| $K_2O$ | 0-10% |
| BaO | 0-5% |
| Total iron (expressed in the form of $Fe_2O_3$) | 0.002-0.06%. |

In accordance with a specific embodiment, the said composition additionally comprises a chromium (expressed in the form of $Cr_2O_3$) content ranging from 0.002% to 0.06% by weight, with respect to the total weight of the glass.

Thus, the invention is based on an entirely novel and inventive approach as it makes it possible to solve the technical problem posed. This is because the inventors have demonstrated, surprisingly, that it is possible, by combining, in a glass composition, a low content of iron and chromium, particularly known as powerful colorant in "selective" coloured glass compositions, in a specific range of contents, to obtain a glass sheet which is very transparent in the IR region without an excessively negative impact on its aesthetic quality or its colour.

Throughout the present text, when a range is indicated, the extremities are included. In addition, all the integral and subdomain values in the numerical range are expressly included as if explicitly written. Also throughout the present text, the values of content as percentages are values by weight, expressed with respect to the total weight of the glass.

Other characteristics and advantages of the invention will become more clearly apparent on reading the following description.

The term "glass", within the meaning of the invention, is understood to mean a completely amorphous material, thus excluding any crystalline material, even partially crystalline material (such as, for example, glass-crystalline or glass-ceramic materials).

The glass sheet according to the invention is made of glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass. According to this preferred embodiment, the composition of the glass sheet can comprise, in a content expressed as percentages by total weight of glass:

| | |
|---|---|
| $SiO_2$ | 60-75% |
| $Al_2O_3$ | 0-4% |
| $B_2O_3$ | 0-4% |
| CaO | 0-15% |
| MgO | 0-10% |
| $Na_2O$ | 5-20% |
| $K_2O$ | 0-10% |
| BaO | 0-5% |
| Total iron (expressed in the form of $Fe_2O_3$) | 0.002-0.06%. |

The glass sheet according to the invention can be a glass sheet obtained by a floating process, a drawing process, a rolling process or any other process known to manufacture a glass sheet starting from a molten glass composition. According to a preferential embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

According to the invention, different chromium-comprising starting materials can be used to introduce the chromium into the glass composition. In particular, chromium oxides CrO, $Cr_2O_3$, $CrO_2$ or $CrO_3$ are possible and relatively pure sources of chromium. Other chromium-rich substances can also be used, such as chromates, chromites or any other chromium-based chemical compound. However, the compounds comprising chromium in its 6+ form are less preferred for reasons of safety.

The glass sheet according to the invention can have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The glass sheet according to the invention can have a thickness varying between 0.1 and 25 mm. Advantageously, in the case of the application of touch panels, the glass sheet according to the invention can have a thickness varying between 0.1 and 6 mm. Preferably, in the case of the touch screens application, for reasons of weight, the thickness of the glass sheet according to the invention is from 0.1 to 2.2 mm.

According to the invention, the composition of the invention comprises a total iron (expressed in terms of $Fe^2O_3$) content ranging from 0.002% to 0.06% by weight, with respect to the total weight of the glass. A total iron (expressed in the form of $Fe_2O_3$) content of less than or equal to 0.06% by weight makes it possible to further increase the IR transmission of the glass sheet. The minimum value makes it possible not to be excessively damaging to the cost of the glass as such low iron values often require expensive, very pure, starting materials and also purification of these. Preferably, the composition comprises a total iron (expressed in the form of $Fe_2O_3$) content ranging from 0.002% to 0.04% by weight, with respect to the total weight of the glass. Very preferably, the composition comprises a total iron (expressed in the form of $Fe_2O_3$) content ranging from 0.002% to 0.02% by weight, with respect to the total weight of the glass.

According to an advantageous embodiment of the invention, the composition of the invention comprises a chromium (expressed in the form of $Cr_2O_3$) content ranging from 0.002% to 0.03% by weight, with respect to the total weight of the glass. Such a range of chromium contents makes it possible to obtain high transmission in the infrared region without excessively damaging the aesthetic appearance or the coloration of the glass sheet. Very preferably, the composition of the invention comprises a chromium (expressed in the form of $Cr_2O_3$) content ranging from 0.002% to 0.02%.

According to a particularly advantageous embodiment of the invention, the composition comprises a total iron (expressed in the form of $Fe_2O_3$) content ranging from 0.002% to 0.02% and a chromium (expressed in the form of $Cr_2O_3$) content ranging from 0.002% to 0.02%, by weight, with respect to the total weight of the glass. Such a composition makes it possible to achieve very low values of coefficient of absorption in the infrared region and in particular at the wavelength of 1050 nm.

According to another embodiment of the invention, the composition comprises an $Fe^{2+}$ (expressed in the form of FeO) content of less than 20 ppm. This range of contents makes it possible to obtain highly satisfactory properties, in particular in terms of transmission of the IR radiation. Preferably, the composition comprises an $Fe^{2+}$ (expressed in the form of FeO) content of less than 10 ppm. Very preferably, the composition comprises an $Fe^{2+}$ (expressed in the form of FeO) content of less than 5 ppm.

According to the invention, the glass sheet has a high transmission of IR radiation. More specifically, the glass sheet of the present invention has a high transmission of radiation in the near infrared region.

In order to quantify the good transmission of the glass in the infrared region, in the present description, use will be made of the coefficient of absorption at the wavelength of 1050 nm, which consequently should be as low as possible in order to obtain good transmission. The coefficient of absorption is defined by the ratio of the absorbance to the length of the optical path travelled by an electromagnetic radiation in a given medium. It is expressed in $m^{-1}$. It is thus independent of the thickness of the material but it is a function of the wavelength of the radiation absorbed and of the chemical nature of the material.

In the case of glass, the coefficient of absorption ($\mu$) at a chosen wavelength $\lambda$ can be calculated from a measurement in transmission (T) and from the refractive index n of the material, the values of n, $\rho$ and T being a function of the chosen wavelength $\lambda$:

$$\mu = -\frac{1}{\text{thick}} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

with $\rho = (n-1)^2/(n+1)^2$

Advantageously, the glass sheet according to the invention has a coefficient of absorption at the wavelength of 1050 nm of less than 5 $m^{-1}$. Preferably, the glass sheet according to the invention has a coefficient of absorption at the wavelength of 1050 nm of less than or equal to 2 $m^{-1}$. Very preferably, the glass sheet according to the invention has a coefficient of absorption at the wavelength of 1050 nm of less than or equal to 1 $m^{-1}$.

Advantageously again, the glass sheet according to the invention has a coefficient of absorption at the wavelength of 950 nm of less than 5 $m^{-1}$. Preferably, the glass sheet according to the invention has a coefficient of absorption at the wavelength of 950 nm of less than or equal to 2 $m^{-1}$. Very preferably, the glass sheet according to the invention has a coefficient of absorption at the wavelength of 950 nm of less than or equal to 1 $m^{-1}$.

Advantageously again, the glass sheet according to the invention has a coefficient of absorption at the wavelength of 850 nm of less than 5 $m^{-1}$. Preferably, the glass sheet according to the invention has a coefficient of absorption at the wavelength of 850 nm of less than or equal to 2 $m^{-1}$. Very preferably, the glass sheet according to the invention has a coefficient of absorption at the wavelength of 850 nm of less than or equal to 1 $m^{-1}$.

According to one embodiment of the invention, the composition of the glass sheet can comprise, in addition to the impurities present in particular in the starting materials, a low proportion of additives (such as agents which help the melting or the refining of the glass) or of components originating from the dissolution of the refractories constituting the melting furnaces.

According to an advantageous embodiment of the invention, the composition of the glass sheet can additionally comprise one or more colorant(s) in an appropriate amount as a function of the effect desired. This/these colorant(s) can be used, for example, to "neutralize" the colour generated by the presence of the chromium and thus to render the colouring of the glass of the invention more neutral or colourless. Alternatively, this/these colorant(s) can be used to obtain a desired colour other than that which can be generated by the presence of the chromium.

According to another advantageous embodiment of the invention, which can be combined with the preceding embodiment, the glass sheet can be coated with a layer or a film which makes it possible to modify or neutralize the colour which can be generated by the presence of the chromium (for example a coloured PVB film).

The glass sheet according to the invention can advantageously be chemically or thermally tempered.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to the applications and/or properties desired, other layers can be deposited on one and/or the other face of the glass sheet according to the invention.

The invention also relates to a touchscreen or a touch panel or a touchpad comprising at least one glass sheet according to the invention defining a touch surface. According to this embodiment, the touchscreen or the touch panel or the touchpad advantageously uses the FTIR or PSD optical technology. In particular, for a screen, the glass sheet is advantageously fitted above a display surface.

Finally, by virtue of its high transmission of infrared radiation, the glass sheet according to the invention can advantageously be used in a touchscreen or touch panel or touchpad using the Planar Scatter Detection (PSD) or Frustrated Total Internal Reflection (FTIR) optical technology to detect the position of one or more objects (for example a finger or a stylus) on a surface of the said sheet.

The examples which follow illustrate the invention, without the intention of in any way limiting its coverage.

EXAMPLES

The startup materials were mixed in powder form and placed in a crucible for melting, according to the basic composition specified in the table below.

| Basic composition | Content [% by weight] |
|---|---|
| $SiO_2$ | 72 |
| CaO | 9 |
| $K_2O$ | 0.3 |
| $Na_2O$ | 14 |
| $SO_3$ | 0.3 |
| $Al_2O_3$ | 0.8 |
| MgO | 4.2 |
| Total iron (expressed as $Fe_2O_3$) | 0.01 |

Different samples were prepared with variable amounts of chromium and the base composition kept constant. Sample 1 (comparative) corresponds to a glass of the state of the art, having a low iron content and not comprising chromium (and referred to as "extra-clear"). Samples 2-4 correspond to glass sheet compositions according to the invention.

The optical properties of each glass sample in the sheet form were determined and in particular the coefficient of absorption at the wavelength of 1050 nm was determined via a measurement in transmission on a Perkin Elmer Lambda 950 spectrophotometer equipped with an integrating sphere with a diameter of 150 mm, the sample being put in the input port of the sphere for the measurement.

The coefficient of absorption at the wavelength of 1050 nm obtained as a function of the amount of chromium added (the chromium was added in the form of chromium(III) oxide) is presented in the table below.

| Sample | % by weight of chromium (expressed in the form of $Cr_2O_3$) | Coefficient of absorption at 1050 nm ($m^{-1}$) | Coefficient of absorption at 950 nm ($m^{-1}$) | Coefficient of absorption at 850 nm ($m^{-1}$) |
|---|---|---|---|---|
| 1 (comparative) | 0 | 6.3 | 6.1 | 5.0 |
| 2 | 0.0021 | 4.5 | 4.2 | 3.6 |
| 3 | 0.0067 | 2.2 | 2.0 | 1.8 |
| 4 | 0.0199 | 0.4 | 0.4 | 0.6 |

These results show that the addition of chromium, within a range of contents according to the invention, makes it possible to significantly reduce the coefficient of absorption at the wavelength of 1050 nm and thus generally to reduce the absorption of the near infrared radiation.

With an amount of total iron of 0.01%, an amount of chromium of approximately 200 ppm is necessary to drop below 1 $m^{-1}$ (value of coefficient of absorption at 1050 nm ideal for the touch applications using the FTIR or PSD optical technology). If the amount of total iron is less than 0.01%, the amount of chromium necessary will be lower, and vice versa.

The invention claimed is:

1. A glass sheet having a composition which comprises, in a content expressed as percentages by total weight of the glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-15% |
| MgO | 0-10% |
| $K_2O$ | 0-10% |
| BaO | 0-5% |
| Total iron (expressed in the form of $Fe_2O_3$) | 0.002-0.06%; | and
chromium (expressed in the form of $Cr_2O_3$) ranging from 0.002% to 0.06%,
wherein the composition comprises an $Fe^{2+}$ (expressed in the form of FeO) content of less than 5 ppm and a coefficient of absorption at a wavelength of 1050 nm of less than or equal to 1 $m^{-1}$.

2. The glass sheet according to claim 1, wherein the composition comprises a chromium (expressed in the form of $Cr_2O_3$) content ranging from 0.002% to 0.03% by weight, with respect to the total weight of the glass.

3. The glass sheet according to claim 1, wherein the composition comprises a chromium (expressed in the form of $Cr_2O_3$) content ranging from 0.002% to 0.02% by weight, with respect to the total weight of the glass.

4. The glass sheet according to claim 3, wherein the composition comprises a total iron (expressed in the form of $Fe_2O_3$) content ranging from 0.002% to 0.04% by weight, with respect to the total weight of the glass.

5. The glass sheet according to claim 1, wherein the composition comprises a total iron (expressed in the form of $Fe_2O_3$) content ranging from 0.002% to 0.04% by weight, with respect to the total weight of the glass.

6. The glass sheet according to claim 1, wherein the composition comprises a total iron (expressed in the form of $Fe_2O_3$) content ranging from 0.002% to 0.02% by weight, with respect to the total weight of the glass.

7. The glass sheet according to claim 1, wherein the composition comprises a total iron (expressed in the form of $Fe_2O_3$) content ranging from 0.002% to 0.02% and a chromium (expressed in the form of $Cr_2O_3$) content ranging from 0.002% to 0.02%, by weight, with respect to the total weight of the glass.

8. The glass sheet according to claim 1, wherein the glass sheet is a sheet of soda-lime-silica glass.

9. The glass sheet according to claim 1, wherein the glass sheet has a thickness between 0.1 and 2.2 mm.

10. The glass sheet according to claim 1, wherein the coefficient of absorption at a wavelength of 850 nm is less than or equal to 1 $m^{-1}$.

11. A touchscreen or panel or pad, comprising at least one glass sheet according to claim 1 defining a touch surface.

12. The touchscreen or panel or pad according to claim 11, using an FTIR or PSD optical technology.

13. The touchscreen or panel or pad according to claim 12, adapted to use the FTIR or PSD optical technology to detect a position of one or more objects on a surface of the glass sheet.

14. A glass sheet having a composition which comprises, in a content expressed as percentages by total weight of the glass:

| | |
|---|---|
| $SiO_2$ | 60-75% |
| $Al_2O_3$ | 0-4% |
| $B_2O_3$ | 0-4% |
| $Na_2O$ | 5-20% |
| CaO | 0-15% |
| MgO | 0-10% |
| $K_2O$ | 0-10% |
| BaO | 0-5% |
| Total iron (expressed in the form of $Fe_2O_3$) | 0.002-0.06%; |

Total iron (expressed in the form of $Fe_2O_3$) 0.002%-0.06%; and
  chromium (expressed in the form of $Cr_2O_3$) ranging from 0.002% to 0.06%,
wherein the composition has an $Fe^{2+}$ (expressed in the form of FeO) content of less than 5 ppm and a coefficient of absorption at a wavelength of 1050 nm of less than or equal to 1 $m^{-1}$.

15. The glass sheet according to claim 14, wherein the composition comprises a chromium (expressed in the form of $Cr_2O_3$) content ranging from 0.002% to 0.03% by weight, with respect to the total weight of the glass.

16. The glass sheet according to claim 14, wherein the composition comprises a total iron (expressed in the form of $Fe_2O_3$) content ranging from 0.002% to 0.02% by weight, with respect to the total weight of the glass.

17. The glass sheet according to claim 14, wherein the composition comprises a total iron (expressed in the form of $Fe_2O_3$) content ranging from 0.002% to 0.02% and a chromium (expressed in the form of $Cr_2O_3$) content ranging from 0.002% to 0.02%, by weight, with respect to the total weight of the glass.

18. The glass sheet according to claim 14, wherein the glass sheet has a thickness between 0.1 and 2.2 mm.

19. A touchscreen or panel or pad, comprising at least one glass sheet according to claim 14 defining a touch surface.

20. The touchscreen or panel or pad according to claim 19, adapted to use FTIR or PSD optical technology to detect a position of one or more objects on a surface of the glass sheet.

* * * * *